US012795432B2

(12) United States Patent
Lv et al.

(10) Patent No.: US 12,795,432 B2
(45) Date of Patent: Nov. 10, 2026

(54) INFORMATION PROCESSING METHOD AND APPARATUS, TERMINAL, AND NETWORK-SIDE DEVICE

(71) Applicant: VIVO MOBILE COMMUNICATION CO., LTD., Guangdong (CN)

(72) Inventors: Huazhang Lv, Guangdong (CN); Xiaowan Ke, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 446 days.

(21) Appl. No.: 18/479,003

(22) Filed: Sep. 30, 2023

(65) Prior Publication Data

US 2024/0031856 A1 Jan. 25, 2024

Related U.S. Application Data

(63) Continuation of application No. PCT/CN2022/084213, filed on Mar. 30, 2022.

(30) Foreign Application Priority Data

Mar. 30, 2021 (CN) ........................ 202110342941.3

(51) Int. Cl.
*H04W 28/02* (2009.01)
*H04L 61/4511* (2022.01)
*H04L 67/63* (2022.01)

(52) U.S. Cl.
CPC ..... *H04W 28/0215* (2013.01); *H04L 61/4511* (2022.05); *H04L 67/63* (2022.05)

(58) Field of Classification Search
None
See application file for complete search history.

(56) References Cited

U.S. PATENT DOCUMENTS

| | | | | |
|---|---|---|---|---|
| 7,177,947 | B1 | 2/2007 | Herzog et al. | |
| 2005/0220061 | A1 | 10/2005 | Wawra et al. | |
| 2019/0394624 | A1* | 12/2019 | Karampatsis | H04W 4/40 |
| 2020/0213265 | A1* | 7/2020 | Deshpande | H04L 61/58 |
| 2022/0166776 | A1* | 5/2022 | Lee | H04L 63/0807 |
| 2022/0174033 | A1 | 6/2022 | Ke et al. | |

(Continued)

FOREIGN PATENT DOCUMENTS

| | | | |
|---|---|---|---|
| CN | 109788078 | A | 5/2019 |
| CN | 111836319 | A | 10/2020 |

(Continued)

OTHER PUBLICATIONS

International Search Report and Written Opinion for Application No. PCT /CN2022/084213, dated Jun. 28, 2022, 11 Pages.

(Continued)

*Primary Examiner* — Angela Nguyen
(74) *Attorney, Agent, or Firm* — BROOKS KUSHMAN P.C.

(57) ABSTRACT

An information processing method and apparatus, a terminal, and a network-side device, and pertains to the field of communication technologies. The information processing method in the embodiments of this application includes: receiving, by a terminal, address information, and sending the address information to an application. The application is, for example, an application in an application layer of the terminal.

19 Claims, 4 Drawing Sheets

(56) References Cited

U.S. PATENT DOCUMENTS

| | | | | |
|---|---|---|---|---|
| 2022/0286892 | A1* | 9/2022 | Zhang | H04W 4/40 |
| 2023/0156767 | A1* | 5/2023 | Hu | H04L 41/5009 370/329 |

FOREIGN PATENT DOCUMENTS

| | | | |
|---|---|---|---|
| JP | 2012023722 | A | 2/2012 |
| WO | 2021051420 | A1 | 3/2021 |

OTHER PUBLICATIONS

Huawei "KI#2, New solution: UE DNS cache flush" 3GPP TSG SA2 Meeting #139E, Elbonia, Jun. 2020, S2-2004128, 3 Pages.
Futurewei, "UE Considerations for EAS rediscovery" SA WG2 Meeting #143E, Electronic, Mar. 2021, S2-2100304, 2 Pages.
Cisco "OS and Anycast Considerations" SA WG2 Meeting #143E, Electronic, Mar. 2021, S2-2101044, 5 Pages.
Extended European Search Report for Application No. 22779047.4, dated Sep. 9, 2024, 15 Pages.
Draft-btw-add-home "DoH and DoT Server Discovery & Deployment Considerations for Home and Mobile Networks" M. Boucadair et al., Mar. 2020, 22 Pages.
Futurewei et al., "UE Considerations for EAS rediscovery" SA WG2 Meeting #143E, Electronic, Feb. 2021, S2-2101104, 2 Pages.
Vivo, Alibaba, Tencent "DNS configuration and DNS cache coordination among SGC, UE and application" SA WG2 Meeting #144E e-meeting, Elbonia, Apr. 2021, S2-2102742, 5 Pages.
Ericsson "DNS Settings handling by application under SLA" 3GPP TSG-SA WG2 Meeting #145-e, e-meeting, May 2021, S2-2103859, 11 Pages.
Samsung "An informative example of DNS client functionality" 3GPP TSG-WG SA2 Meeting #147E, Electronic Meeting, Oct. 2021, S2-2107283, 3 Pages.
Vivo "Provision of DNS server IP address to applications independent of UE OS capability" 3GPP TSG-WG SA2 Meeting #148E e-Meeting, Elbonia, Nov. 2021, S2-2108544, 5 Pages.
First Office Action for Japanese Application No. 2023-552262, dated Oct. 24, 2024, 14 Pages.
Vivo "Conclusion update to whether all or part of DNS cache to be cleared" SA WG2 Meeting #142E, Electronic, Nov. 16, 2020, S2-2008669, 2 Pages.
3rd Generation Partnership Project, Technical Specification Group Services and System Aspects; System architecture for the 5G System (5GS) Stage 2 (Release 16). 3GPP TS 23.501 V16.4.0 Online. Mar. 2020. 421 pages.
3rd Generation Partnership Project; Technical Specification Group Services and System Aspects; Procedures for the 5G System (5GS) Stage 2 (Release 16). 3GPP TS 23.502 V16.4.0. Mar. 2020. 576 pages.
3rd Generation Partnership Project; Technical Specification Group Core Network and Terminals; 5G System; Interworking between 5G Network and external Data Networks Stage 3 (Release 16). 3GPP TS 29.561 V16.5.0. Sep. 2020. 70 pages.
First Indian Office Action for Indian Patent Application No. 202317072592 mailed Apr. 13, 2026. 8 pages.

* cited by examiner

INFORMATION PROCESSING METHOD AND APPARATUS, TERMINAL, AND NETWORK-SIDE DEVICE

CROSS-REFERENCE TO RELATED APPLICATIONS

This application is a continuation of PCT International Application No. PCT/CN2022/084213 filed on Mar. 30, 2022, which claims priority to Chinese Patent Application No. 202110342941.3, filed on Mar. 30, 2021, which are incorporated herein by reference in their entireties.

TECHNICAL FIELD

This application pertains to the field of communication technologies and specifically relates to an information processing method and apparatus, a terminal, and a network-side device.

BACKGROUND

In the prior art, a network-side device can select a domain name system (DNS) server with an optimal route for a terminal based on a location of the terminal, and then deliver corresponding address information to the terminal, so that an application in the terminal can use the address information. However, currently, a kernel of the terminal does not support transmission of the address information. As a result, the application in the terminal cannot use the address information configured by a network side.

SUMMARY

According to a first aspect, an information processing method is provided, including:

receiving, by a terminal, address information; and sending, by the terminal, the address information to an application.

According to a second aspect, an information processing method is provided, including:

sending, by a network-side device, a forwarding indication; where the forwarding indication indicates a terminal to send received address information to an application corresponding to the address information.

According to a third aspect, an information processing method is provided, including:

when a first condition is met, clearing, by a terminal, a DNS cache in the terminal; where the first condition includes at least one of the following:

the terminal has released an old IP address;

the terminal has received a newly allocated IP address;

the terminal has received an indication for releasing the old IP address; and the terminal has sensed a change of an IP address.

According to a fourth aspect, an information processing apparatus is provided, including:

a first receiving module, configured to receive address information; and a first sending module, configured to send the address information to an application.

According to a fifth aspect, an information processing apparatus is provided, including:

a second sending module, configured to send a forwarding indication; where the forwarding indication indicates a terminal to send received address information to an application corresponding to the address information.

According to a sixth aspect, an information processing apparatus is provided, including:

a processing module, configured to: when a first condition is met, clear a DNS cache in a terminal; where the first condition includes at least one of the following:

the terminal has released an old IP address;

the terminal has received a newly allocated IP address;

the terminal has received an indication for releasing the old IP address; and the terminal has sensed a change of an IP address.

According to a seventh aspect, a terminal is provided. The terminal includes a processor, a memory, and a program or instructions stored in the memory and capable of running on the processor, where when the program or instructions are executed by the processor, the steps of the method according to the first aspect are implemented, or the steps of the method according to the third aspect are implemented.

According to an eighth aspect, a terminal is provided, including a processor and a communication interface, where the communication interface is configured to receive address information and send the address information to an application. Alternatively, the processor is configured to: when a first condition is met, clear a DNS cache in the terminal. The first condition includes at least one of the following: the terminal has released an old IP address; the terminal has received a newly allocated IP address; the terminal has received an indication for releasing the old IP address; and the terminal has sensed a change of an IP address.

According to a ninth aspect, a network-side device is provided. The network device includes a processor, a memory, and a program or instructions stored in the memory and capable of running on the processor, where when the program or instructions are executed by the processor, the steps of the method according to the second aspect are implemented.

According to a tenth aspect, a network-side device is provided, including a processor and a communication interface, where the processor is configured to send an forwarding indication, and the forwarding indication indicates a terminal to send received address information to an application corresponding to the address information.

According to an eleventh aspect, a readable storage medium is provided. The readable storage medium stores a program or instructions, and when the program or instructions are executed by a processor, the steps of the method according to the first aspect, or the steps of the method according to the second aspect, or the steps of the method according to the third aspect are implemented.

According to a twelfth aspect, a chip is provided. The chip includes a processor and a communication interface. The communication interface is coupled to the processor, and the processor is configured to run a program or instructions to implement the steps of the method according to the first aspect, or the steps of the method according to the second aspect, or the steps of the method according to the third aspect.

According to a thirteenth aspect, a computer program/program product is provided. The computer program/program product is stored in a non-volatile storage medium, the program/program product is executed by at least one processor to implement the steps of the method according to the first aspect, or the steps of the method according to the second aspect, or the steps of the method according to the third aspect.

According to a fourteenth aspect, a communication device is provided and configured to perform the steps of the method according to the first aspect, or the steps of the method according to the second aspect, or the steps of the method according to the third aspect.

DETAILED DESCRIPTION

The following clearly describes technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in the specification and claims of this application are used to distinguish between similar objects rather than to describe a specific order or sequence. It should be understood that the terms used in this way are interchangeable in appropriate circumstances such that the embodiments of this application can be implemented in other orders than the order illustrated or described herein. In addition, objects distinguished by "first" and "second" are generally of a same type, and the number of objects is not limited, for example, there may be one or more first objects. In addition, in the specification and claims, "and/or" indicates at least one of connected objects, and the character "/" generally indicates an "or" relationship between associated objects.

It should be noted that the technologies described in the embodiments of this application are not limited to a long term evolution (LTE)/LTE-advanced (LTE-A) system, but may also be used in other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. In the following descriptions, a new radio (NR) system is described for an illustrative purpose, and NR terms are used in most of the following descriptions. However, these technologies may also be applied to other applications than an NR system application, for example, a 6th generation (6G) communication system.

Figure 1:
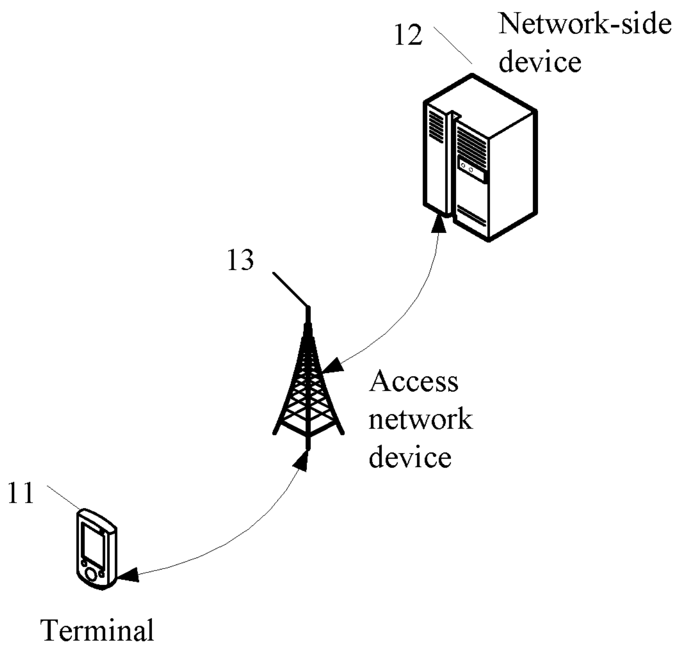
FIG. 1 is a block diagram of a wireless communication system to which the embodiments of this application are applicable.

FIG. 1 is a block diagram of a wireless communication system to which the embodiments of this application are applicable. The wireless communication system includes a terminal 11, a network-side device 12, and an access network device 13. The terminal 11 may also be referred to as a terminal device or a user equipment (UE). The terminal 11 may be a terminal-side device such as a mobile phone, a tablet personal computer, a laptop computer or referred to as a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes wrist bands, earphones, glasses, and the like. It should be noted that a specific type of the terminal 11 is not limited in this embodiment of this application. The network-side device 12 may be a core-network device. The core-network device may include but is not limited to at least one of the following: a core-network node, a core-network function, a mobility management entity (MME), an access and mobility management function (AMF), a session management function (SMF), a user plane function (UPF), a policy control function (PCF), a policy and charging rules function (PCRF), an edge application server discovery function (EASDF), an application function (AF), and the like. The access network device 13 may be a base station. It should be noted that a core-network device in a 5G system is used merely as an example in the embodiments of this application, rather than a limitation.

The following specifically describes content included in this application.

(1) At present, a new network element is provided, namely an edge application server discovery function (EASDF). The EASDF can select a DNS server with an optimal route for UE based on a location of the UE, and then a 5G core network (5GC) delivers a DNS configuration such as address information of the DNS server to the UE through an extended protocol configuration options (ePCO) process. The ePCO process refers to delivering the DNS configuration to a chip module of the UE, and then forwarding the DNS configuration to an operating system (OS) of the UE. The 5GC delivers an optimized DNS server address to the UE, mainly to allow an application in an application layer to use this optimization.

At present, the UE sends information, such as address information of the DNS server, obtained from a non-access stratum (NAS) to an application in an application layer of the UE, which needs to go through a kernel of the UE and be supported by the kernel. However, an existing kernel of the UE does not support sending the address information to the application. To be specific, the existing kernel does not support sending the address information of the DNS server to the UE. Therefore, to support transmission of a DNS server address, an additional capability of the UE is required.

One solution is that the UE has a capability to forward a DNS server address obtained from the 5GC to the application in the application layer, so as to replace or update a DNS server address maintained by the application. This solution aims to enable the application in the application layer to use the DNS server address configured by the 5GC for the UE, to benefit from this 5GC configuration, such as a shortest route and a shortest access time. In addition, the UE may carry an indication of this capability of the UE in a process of protocol data unit (PDU) session establishment or PDU session modification request, for indicating whether the UE supports or does not support sending the DNS server address to the application in the application layer. If the UE supports this capability, when delivering the DNS server address, the 5GC may indicate the UE to forward the DNS server address to a corresponding application in the application layer.

(2) For an Internet Protocol version 6 (IPv6) multi-homing scenario, when a PDU session is released, the UE may clear a DNS cache stored inside the UE, or the UE may clear a DNS cache that is related to the PDU session and that is inside the UE.

In the embodiments of this application, a DNS configuration stored in a terminal, for example, a location of address information of a domain name server, mainly includes:

1. An OS of the terminal.
2. A storage area that is corresponding to each application in an application layer and that is in the terminal. To be specific, each application in the application layer has a storage area (which may also be referred to as a cache area) inside the terminal to store a DNS configuration for each application. This storage area is located inside the terminal.
3. A storage area of each application in the application layer of the terminal. To be specific, each application has its own cache, and each application maintains one DNS configuration. This storage area is located in the application layer.

The following describes in detail an information processing method provided in the embodiments of this application by using some embodiments and application scenarios thereof with reference to the accompanying drawings.

Figure 2:
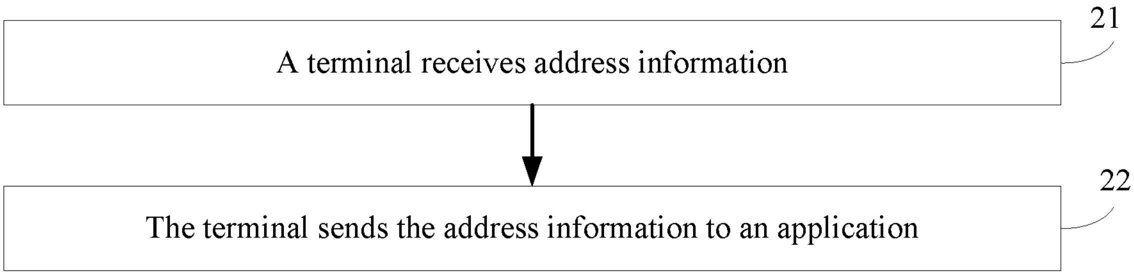
FIG. 2 is a flowchart of an information processing method according to an embodiment of this application.

Referring to FIG. 2, FIG. 2 is a flowchart of an information processing method according to an embodiment of this application. The method is performed by a terminal, and as shown in FIG. 2, the method includes the following steps.

Step 21: The terminal receives address information.

In this embodiment, the address information may optionally be address information of a server, for example, including address information of a domain name server. The domain name server may include at least one of the following: an EASDF, a central DNS (C-DNS) server, and a local DNS (L-DNS) server.

The address information may be DNS configuration information, for example, an Internet Protocol (IP) address of a DNS server. For example, the address information may be an IP address of the EASDF, an IP address of the C-DNS, or an IP address of the L-DNS.

In an implementation, the terminal may receive the address information from a network-side device, for example, receive the address information of the domain name server from the network-side device. The network-side device is, for example, a 5GC network element, including but not limited to an access and mobility management function (AMF), a session management function (SMF), a user plane function (UPF), an EASDF, and the like.

Step 22: The terminal sends the address information to an application.

In this embodiment, the application in this step is specifically an application in an application layer of the terminal, including but not limited to an application APP, an edge enabler client (EEC), an application client A (AC), and the like.

For example, after obtaining the IP address of the DNS server, an OS of the terminal may forward the IP address of the DNS server to the application in the application layer.

According to the information processing method in this embodiment of this application, after receiving the address information, the terminal may send the address information to the application, for example, send to the application in the application layer of the terminal. In this way, the application can use the address information configured by a network side, thereby improving service performance.

In this embodiment of this application, to enable the terminal to accurately forward the obtained address information, the network-side device may further send a forwarding indication to the terminal when delivering the address information. The forwarding indication indicates the terminal to send the received address information to an application corresponding to the address information, so that the terminal forwards the address information according to the forwarding indication.

Optionally, the information processing method in this embodiment may further include:

receiving, by the terminal, a forwarding indication; for example, the terminal receives the forwarding indication from the network-side device.

Further, the sending the address information to an application may include: sending, by the terminal, the address information to the application corresponding to the address information according to the forwarding indication. In this way, the terminal can accurately route the address information by means of the forwarding indication.

Optionally, the forwarding indication may include an identification of the application corresponding to the address information, so that the terminal learns the application corresponding to the address information based on the identification, thereby accurately routing the address information.

Optionally, the identification (ID) of the application may include but is not limited to at least one of the following: an APP ID, a PDU session ID, an EEC ID, an AC ID, an EEC provider ID, and the like. The PDU session ID may correspond to a data network name (DNN), single network slice selection assistance information (S-NSSAI), and the like. To be specific, when forwarding the address information to the corresponding application, the terminal may forward based on at least one of the APP ID, the PDU session ID, the EEC ID, the AC ID, and the EEC provider ID.

In this embodiment of this application, the terminal may send the address information to the application by storing the address information in a corresponding storage area and updating or replacing original address information. A process of sending the address information to the application may include at least one of the following.

(1) The terminal stores the address information in a first area to update or replace original address information stored in the first area. The first area is a storage area of the application in the application layer, that is, the first area is located in the application layer of the terminal, and is a storage area of the corresponding application in the application layer.

(2) The terminal stores the address information in a second area to update or replace original address information stored in the second area. The second area is a storage area that is corresponding to the application and that is in the terminal, that is, the second area is located inside the terminal, and is a storage area that is corresponding to the corresponding application and that is in the terminal. It should be noted that the second area is not located in the application layer of the terminal, but is the storage area inside the terminal.

Optionally, to enable the network-side device to learn whether the terminal supports forwarding the address information to the application, the terminal may report a capability indication. The capability indication indicates that the terminal supports or does not support forwarding the address information to the application.

In an implementation, the terminal may report the capability indication to the network-side device, and the network-side device includes but is not limited to an AMF, an SMF, and the like.

In an implementation, after learning, through the capability indication reported by the terminal, that the terminal supports forwarding the address information to the application, the network-side device may send the forwarding indication to the terminal to indicate the terminal to forward the received address information to the corresponding application.

Optionally, the terminal may report the capability indication by using at least one of the following: a PDU session establishment request, a PDU session modification request, and the like.

Optionally, the terminal may receive the forwarding indication by using at least one of the following: PDU session establishment accept, PDU session modification accept, and the like.

Optionally, in this embodiment of this application, when a first condition is met, the terminal may clear a DNS cache in the terminal. The first condition may include at least one of the following:

the terminal has released an old IP address;

the terminal has received a newly allocated IP address;

the terminal has received an indication for releasing the old IP address; and the terminal has sensed a change of an IP address.

Optionally, the terminal may receive the newly allocated IP address from the network-side device such as the AMF and the SMF, and/or receive the indication for releasing the old IP address.

Optionally, a process of the terminal clearing the DNS cache in the terminal may include any of the following: the terminal clearing a DNS cache that is related to the old IP address and that is in the terminal, and the terminal clearing all DNS caches in the terminal.

Optionally, the IP address includes at least one of the following: an Internet Protocol version 6 IPv6 prefix, an IP address of the terminal, an IP address of a PDU session, and an IP address of a user plane function.

It can be understood that, according to this embodiment, when the first condition is met, the terminal may clear the DNS cache in the terminal, so as to clarify processing of the DNS cache in, for example, an Ipv6 multi-homing scenario.

Figure 3:
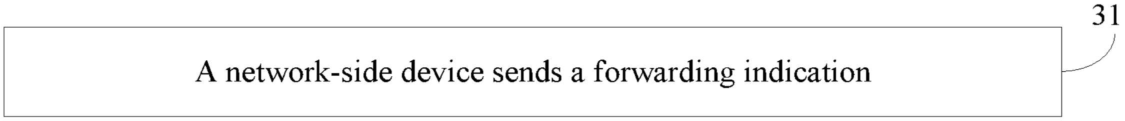
FIG. 3 is a flowchart of another information processing method according to an embodiment of this application.

Referring to FIG. 3, FIG. 3 is a flowchart of an information processing method according to an embodiment of this application. The method is performed by a network-side device, and the network-side device is, for example, a 5GC network element, including but not limited to an AMF, an SMF, a UPF, an EASDF, and the like. As shown in FIG. 3, the method includes the following steps.

Step 31: The network-side device sends a forwarding indication.

In this embodiment, the forwarding indication indicates a terminal to send received address information to an application corresponding to the address information. For example, the network-side device sends the forwarding indication to the terminal.

Optionally, the forwarding indication may include an identification of the application corresponding to the address information, so that the terminal learns the application corresponding to the address information based on the identification, thereby accurately routing the address information.

According to the information processing method in this embodiment of this application, the network-side device sends the forwarding indication, so that the terminal sends the received address information to the corresponding application. Therefore, the application can use the address information configured by a network side, thereby improving service performance.

Optionally, before the sending a forwarding indication, the network-side device may receive a capability indication of the terminal. The capability indication indicates that the terminal supports or does not support forwarding the address information to the application. When the capability indication indicates that the terminal supports forwarding the address information to the application, the forwarding indication is sent. To be specific, after learning, through the capability indication reported by the terminal, that the terminal supports forwarding the address information to the application, the network-side device may send the forwarding indication to the terminal to indicate the terminal to forward the received address information to the corresponding application.

Figure 4:
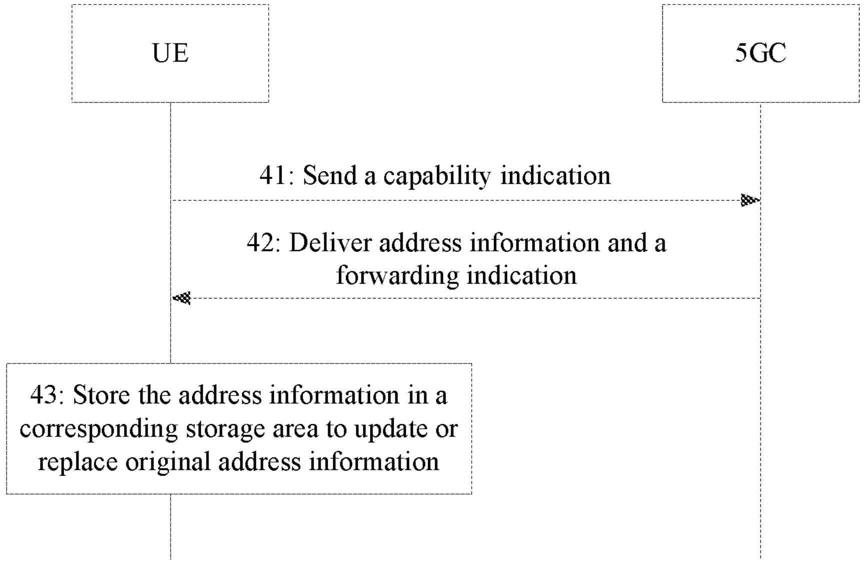
FIG. 4 is a flowchart of an information processing process according to an embodiment of this application.

The following describes a specific embodiment of this application with reference to FIG. 4. As shown in FIG. 4, an information processing process in this specific embodiment of this application may include the following steps.

Step 41: UE sends a capability indication to the a 5GC to indicate that the UE supports forwarding address information to a corresponding application in an application layer. Optionally, the capability indication may be sent by using a PDU session establishment request or a PDU session modification request.

Step 42: The 5GC delivers a DNS configuration, for example, address information of a domain name server to the UE, and may further send a forwarding indication to the UE to indicate the terminal to send the received address information to the corresponding application. Optionally, the forwarding indication may be sent by using PDU session establishment accept or PDU session modification accept.

Step 43: After receiving the address information of the domain name server and the forwarding indication, the UE stores the address information in a storage area of the corresponding application in the application layer, or stores the address information to a storage area that is corresponding to the application and that is in the UE, to update or replace original address information. Optionally, the application may be an APP, an AC and/or an EEC.

In this way, in the information processing process, the application in the UE can use an optimal DNS configuration configured by the 5GC for the application, such as a shortest route and a shortest access time, thereby improving service performance.

Figure 5:
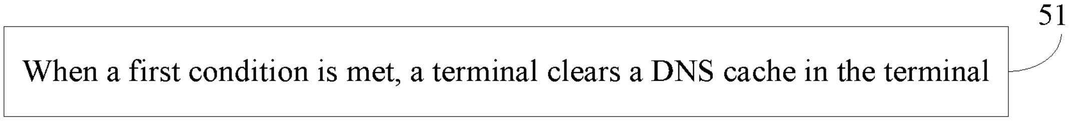
FIG. 5 is a flowchart of another information processing method according to an embodiment of this application.

Referring to FIG. 5, FIG. 5 is a flowchart of an information processing method according to an embodiment of this application. The method is performed by a terminal, and as shown in FIG. 5, the method includes the following steps.

Step 51: When a first condition is met, the terminal clears a DNS cache in the terminal In this embodiment, the first condition may include at least one of the following:

the terminal has released an old IP address;

the terminal has received a newly allocated IP address;

the terminal has received an indication for releasing the old IP address; and the terminal has sensed a change of an IP address.

Optionally, the terminal may receive the newly allocated IP address from a network-side device such as an AMF and an SMF, and/or receive the indication for releasing the old IP address.

Optionally, a process of the terminal clearing the DNS cache in the terminal may include any of the following: the terminal clearing a DNS cache that is related to the old IP address and that is in the terminal, and the terminal clearing all DNS caches in the terminal.

Optionally, the IP address may include at least one of the following: an Ipv6 prefix, an IP address of the terminal, an IP address of a PDU session, an IP address of a UPF, and the like.

According to the information processing method in this embodiment of this application, when the first condition is met, the terminal may clear the DNS cache in the terminal, so as to clarify processing of the DNS cache in, for example, an Ipv6 multi-homing scenario.

Figure 6:
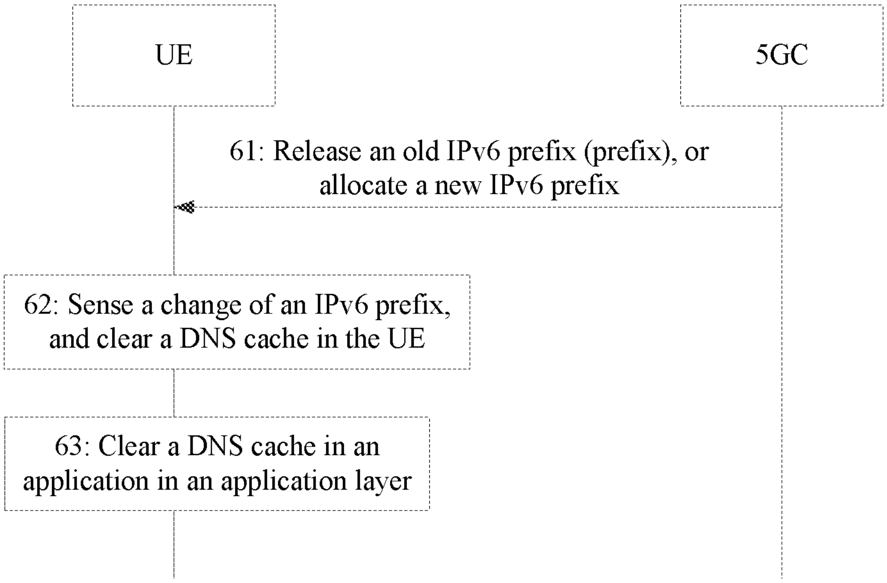
FIG. 6 is a flowchart of another information processing process according to an embodiment of this application.

The following describes a specific embodiment of this application with reference to FIG. 6. As shown in FIG. 6, an information processing process in this specific embodiment of this application may include the following steps.

Step 61: A 5GC network element, for example, an SMF releases an old Ipv6 prefix of UE, and the UE also releases the old Ipv6 prefix, or the SMF allocates a new Ipv6 prefix to the UE.

Step 62: The UE senses a change of the Ipv6 prefix. This change includes both the release of the old Ipv6 prefix and the allocation of the new Ipv6 prefix to the UE. Then, the UE clears a DNS cache in the UE, or the UE clears a DNS cache that is related to the old Ipv6 prefix and that is in the UE.

Step 63: Optionally, an OS of the UE may trigger clearing of a DNS cache in an application in an application layer. The UE clears the DNS cache in the application in the application layer, or the UE clears a DNS cache that is related to the old Ipv6 prefix and that is in the application in the application layer. To implement this clearing process, the UE needs to have a capability that an operation of the OS of the UE can influence the application layer, and a policy of the application allows the UE to perform this operation.

It should be noted that the information processing method provided in the embodiments of this application may be performed by an information processing apparatus, or a control module configured to perform the information processing method in the information processing apparatus. In the embodiments of this application, the information processing apparatus provided in the embodiments of this application is described by using an example in which the information processing apparatus performs the information processing method.

Figure 7:
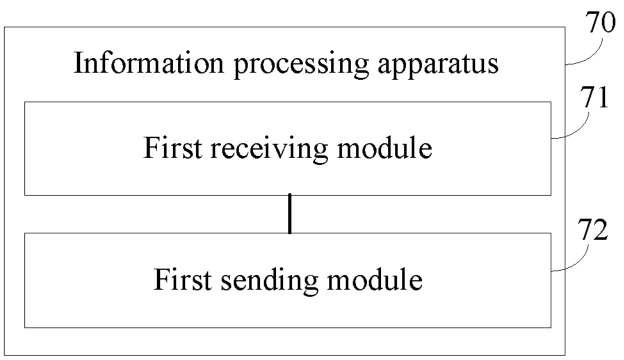
FIG. 7 is a schematic structural diagram of an information processing apparatus according to an embodiment of this application.

Referring to FIG. 7, FIG. 7 is a schematic structural diagram of an information processing apparatus according to an embodiment of this application. The apparatus is applied to a terminal. As shown in FIG. 7, the information processing apparatus 70 includes:

a first receiving module 71, configured to receive address information; and a first sending module 72, configured to send the address information to an application.

Optionally, the address information includes: address information of a domain name server.

Optionally, the first receiving module 71 is further configured to receive a forwarding indication; and the first sending module 72 is further configured to send the address information to an application corresponding to the address information according to the forwarding indication.

Optionally, the forwarding indication includes: an identification of the application corresponding to the address information.

Optionally, the identification of the application includes at least one of the following:

an APP ID, a PDU session ID, an EEC ID, an AC ID, and an EEC provider ID.

Optionally, the first sending module 72 is further configured to perform at least one of the following:

storing the address information in a first area, where the first area is a storage area of the application in an application layer; and storing the address information in a second area, where the second area is a storage area that is corresponding to the application and that is in the terminal.

Optionally, the application is an application in the application layer of the terminal.

Optionally, the information processing apparatus 70 further includes:

a reporting module, configured to report a capability indication; where the capability indication indicates that the terminal supports or does not support forwarding the address information to the application.

Optionally, the reporting module is specifically configured to report the capability indication by using at least one of the following: a PDU session establishment request and a PDU session modification request.

Optionally, the first receiving module 71 is further configured to receive the forwarding indication by using at least one of the following: PDU session establishment accept and PDU session modification accept.

Optionally, the domain name server includes at least one of the following: an EASDF, a central DNS server, and a local DNS server.

The information processing apparatus 70 in this embodiment of this application may be an apparatus, an apparatus or electronic device with an operating system, or a component, an integrated circuit, or a chip in a terminal. The apparatus or the electronic device may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The information processing apparatus 70 provided in this embodiment of this application is capable of implementing the processes implemented in the method embodiment of FIG. 2, with the same technical effects achieved. To avoid repetition, details are not described herein again.

Figure 8:
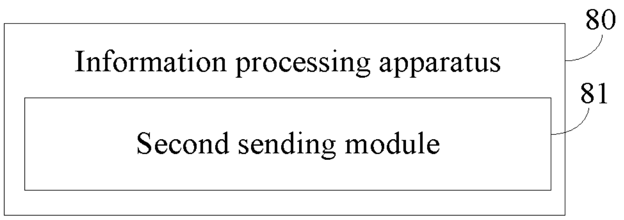
FIG. 8 is another schematic structural diagram of an information processing apparatus according to an embodiment of this application.

Referring to FIG. 8, FIG. 8 is a schematic structural diagram of an information processing apparatus according to an embodiment of this application. The apparatus is applied to a network-side device. As shown in FIG. 8, the information processing apparatus 80 includes:

a second sending module 81, configured to send a forwarding indication; where the forwarding indication indicates a terminal to send received address information to an application corresponding to the address information.

Optionally, the information processing apparatus 80 further includes:

a second receiving module, configured to receive a capability indication of the terminal; where the capability indication indicates that the terminal supports or does not support forwarding the address information to the application.

The second sending module 81 is further configured to: when the capability indication indicates that the terminal supports forwarding the address information to the application, send the forwarding indication.

Optionally, the forwarding indication includes: an identification of the application corresponding to the address information.

The information processing apparatus 80 provided in this embodiment of this application is capable of implementing the processes implemented in the method embodiment of FIG. 3, with the same technical effects achieved. To avoid repetition, details are not described herein again.

Figure 9:
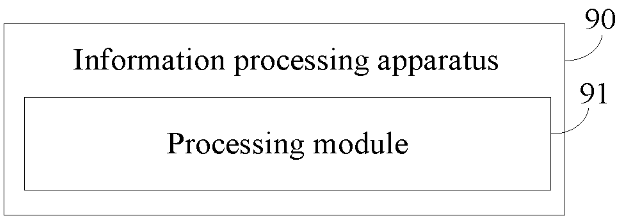
FIG. 9 is another schematic structural diagram of an information processing apparatus according to an embodiment of this application.

Referring to FIG. 9, FIG. 9 is a schematic structural diagram of an information processing apparatus according to an embodiment of this application. The apparatus is applied to a terminal. As shown in FIG. 9, the information processing apparatus 90 includes:

a processing module 91, configured to: when a first condition is met, clear a DNS cache in a terminal; where the first condition includes at least one of the following:

the terminal has released an old IP address;

the terminal has received a newly allocated IP address;

the terminal has received an indication for releasing the old IP address; and the terminal has sensed a change of an IP address.

Optionally, the information processing apparatus 90 may further include a releasing module, a receiving module, a sensing module, and the like. For example, the releasing module is configured to release the old IP address; the receiving module is configured to receive the newly allocated IP address, and/or receive the indication for releasing the old IP address; and the sensing module is configured to sense the change of the IP address.

Optionally, the IP address includes at least one of the following:

an Internet Protocol version 6 IPv6 prefix, an IP address of the terminal, an IP address of a PDU session, and an IP address of a user plane function.

Optionally, the processing module 91 is specifically configured to perform any one of the following:

clearing a DNS cache that is related to the old IP address and that is in the terminal; and clearing all DNS caches in the terminal.

The information processing apparatus 90 in this embodiment of this application may be an apparatus, an apparatus or electronic device with an operating system, or a component, an integrated circuit, or a chip in a terminal. The apparatus or the electronic device may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The information processing apparatus 90 provided in this embodiment of this application is capable of implementing the processes implemented in the method embodiment shown in FIG. 5, with the same technical effects achieved. To avoid repetition, details are not described herein again.

Figure 10:
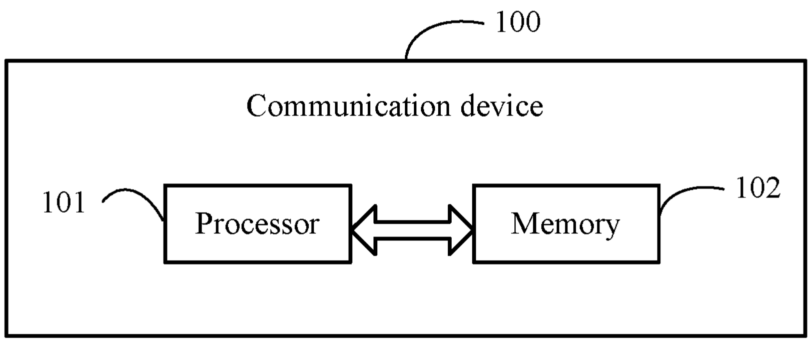
FIG. 10 is a schematic structural diagram of a communication device according to an embodiment of this application.

Optionally, as shown in FIG. 10, an embodiment of this application further provides a communication device 100, including a processor 101, a memory 102, and a program or instructions stored in the memory 102 and capable of running on the processor 101. For example, when the communication device 100 is a terminal and when the program or instructions are executed by the processor 101, the processes of the foregoing method embodiment shown in FIG. 2 or FIG. 5 are implemented, with the same technical effects achieved. When the communication device 100 is a network-side device and when the program or instructions are executed by the processor 101, the processes of the foregoing method embodiment shown in FIG. 3 are implemented, with the same technical effects achieved. To avoid repetition, details are not described herein again.

An embodiment of this application further provides a terminal, including a processor and a communication interface. The communication interface is configured to receive address information and send the address information to an application. The terminal embodiment corresponds to the foregoing method embodiment shown in FIG. 2, and the implementation processes and implementations of the foregoing method embodiment are applicable to the terminal embodiment, with the same technical effects achieved. Alternatively, the processor is configured to: when a first condition is met, clear a DNS cache in the terminal. The first condition includes at least one of the following: the terminal has released an old IP address; the terminal has received a newly allocated IP address; the terminal has received an indication for releasing the old IP address; and the terminal has sensed a change of an IP address. The terminal embodiment corresponds to the foregoing method embodiment shown in FIG. 5, and the implementation processes and implementations of the foregoing method embodiment shown in FIG. 5 are applicable to the terminal embodiment, with the same technical effects achieved.

Figure 11:
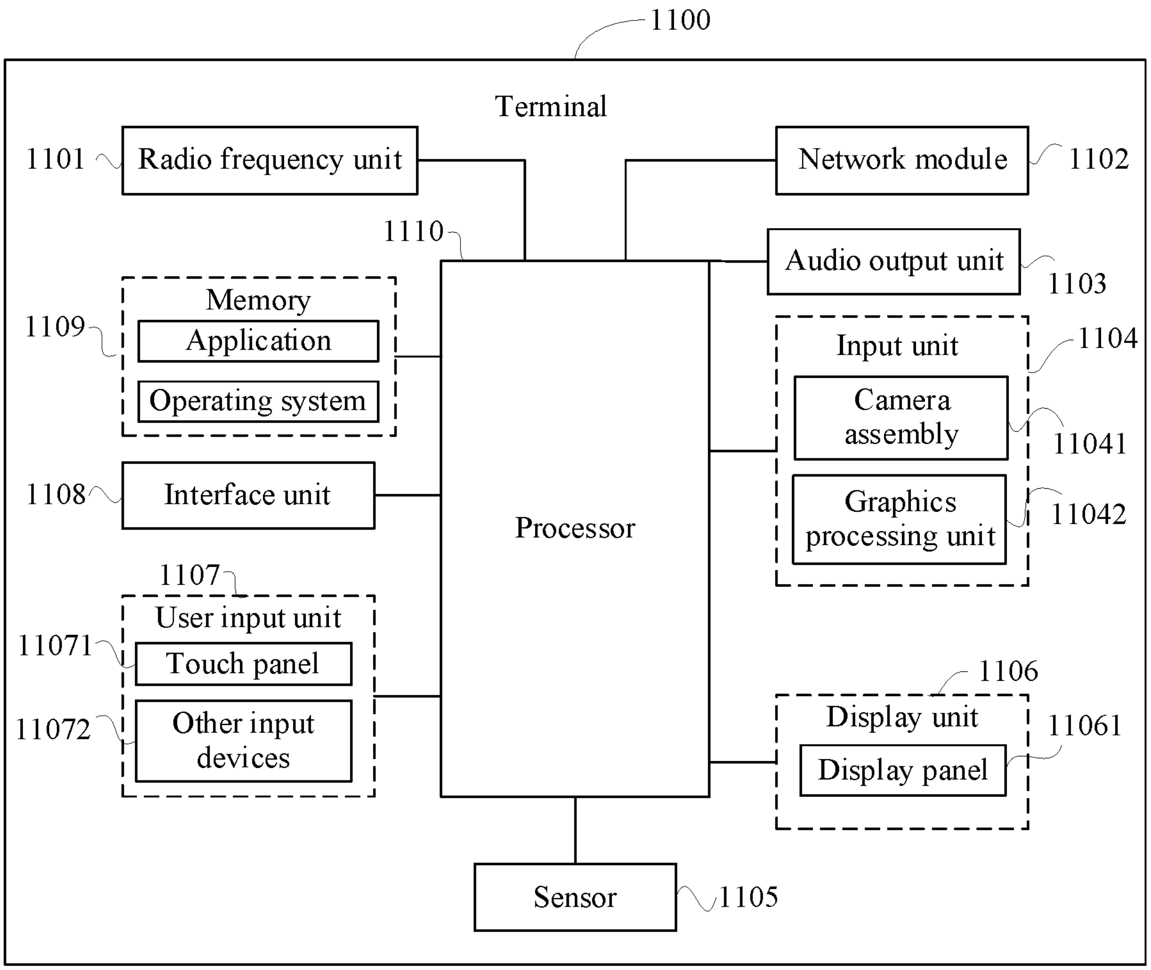
FIG. 11 is a schematic structural diagram of a terminal according to an embodiment of this application.

Specifically, FIG. 11 is a schematic diagram of a hardware structure of a terminal for implementing the embodiments of this application.

A terminal 1100 includes but is not limited to at least a part of components such as a radio frequency unit 1101, a network module 1102, an audio output unit 1103, an input unit 1104, a sensor 1105, a display unit 1106, a user input unit 1107, an interface unit 1108, a memory 1109, and a processor 1110.

A person skilled in the art can understand that the terminal 1100 may further include a power supply (for example, a battery) for supplying power to the components. The power supply may be logically connected to the processor 1110 via a power management system. In this way, functions such as charge management, discharge management, and power consumption management are implemented via the power management system. The terminal structure shown in FIG. 11 does not constitute any limitation on the terminal. The terminal may include more or fewer components than shown in the figure, or combine some of the components, or have the components arranged differently, which are not further described herein.

It should be understood that in this embodiment of this application, the input unit 1104 may include a graphics processing unit (GPU) 11041 and a microphone 11042. The graphics processing unit 11041 processes image data of a static picture or a video obtained by an image capture apparatus (for example, a camera) in a video capture mode or an image capture mode. The display unit 1106 may include a display panel 11061. The display panel 11061 may be configured in a form of a liquid crystal display, an organic light-emitting diode, or the like. The user input unit 1107 includes a touch panel 11071 and other input devices 11072. The touch panel 11071 is also referred to as a touchscreen. The touch panel 11071 may include two parts: a touch detection apparatus and a touch controller. The other input devices 11072 may include but are not limited to a physical keyboard, a functional key (such as a volume control key or a power on/off key), a trackball, a mouse, and a joystick. Details are not described herein.

In this embodiment of this application, the radio frequency unit 1101 receives downlink data from a network-side device and then sends the downlink data to the processor 1110 for processing; and sends uplink data to the network-side device. Usually, the radio frequency unit 1101 includes but is not limited to an antenna, at least one amplifier, a transceiver, a coupler, a low noise amplifier, a duplexer, and the like.

The memory 1109 may be configured to store a software program or instructions and various data. The memory 1109 may mainly include a program or instruction storage area and a data storage area. The program or instruction storage area may store an operating system, an application or instructions required by at least one function (for example, a sound playback function or an image playback function), and the like. In addition, the memory 1109 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another non-volatile solid-state storage device.

The processor 1110 may include one or more processing units. Optionally, an application processor and a modem processor may be integrated into the processor 1110. The application processor mainly processes an operating system, a user interface, an application or instructions, and the like. The modem processor mainly processes wireless communication, for example, a baseband processor. It can be understood that the modem processor may alternatively be not integrated into the processor 1110.

The radio frequency unit 1101 is configured to receive address information and send the address information to an application.

Optionally, the address information includes: address information of a domain name server.

Optionally, the radio frequency unit 1101 is further configured to receive a forwarding indication, and send the address information to an application corresponding to the address information according to the forwarding indication.

Optionally, the forwarding indication includes: an identification of the application corresponding to the address information.

The terminal 1100 provided in this embodiment of this application is capable of implementing the processes implemented in the method embodiment shown in FIG. 2, with the same technical effects achieved. To avoid repetition, details are not described herein again.

Alternatively, a processor 1110 is configured to: when a first condition is met, clear a DNS cache in the terminal 1100; where the first condition includes at least one of the following:

the terminal 1100 releases an old IP address;

the terminal 1100 receives a newly allocated IP address;

the terminal 1100 receives an indication for releasing the old IP address; and the terminal 1100 senses a change of an IP address.

Optionally, the IP address includes at least one of the following:

an IPv6 prefix, an IP address of the terminal, an IP address of a PDU session, and an IP address of a user plane function.

Optionally, the processor 1110 is further configured to perform any one of the following:

clearing a DNS cache that is related to the old IP address and that is in the terminal 1100; and clearing all DNS caches in the terminal 1100.

The terminal 1100 provided in this embodiment of this application is capable of implementing the processes implemented in the method embodiment shown in FIG. 5, with the same technical effects achieved. To avoid repetition, details are not described herein again.

An embodiment of this application further provides a network-side device, including a processor and a communication interface. The communication interface is configured to send a forwarding indication. The forwarding indication indicates a terminal to send received address information to an application corresponding to the address information. The network-side device embodiment corresponds to the foregoing method embodiment of the network-side device, and the implementation processes and implementations of the foregoing method embodiment are applicable to the network-side device embodiment, with the same technical effects achieved.

Figure 12:
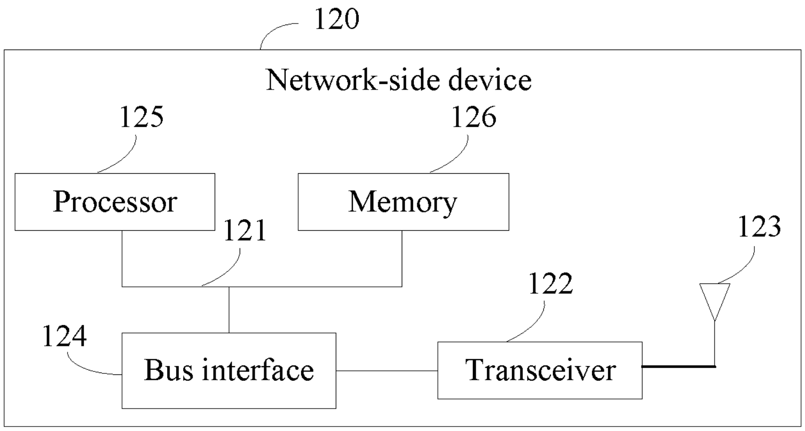
FIG. 12 is a schematic structural diagram of a network-side device according to an embodiment of this application.

Specifically, an embodiment of this application further provides a network-side device. As shown in FIG. 12, the network-side device 120 includes a bus 121, a transceiver 122, an antenna 123, a bus interface 124, a processor 125, and a memory 126. The bus 121 may include any quantity of interconnected buses and bridges, and the bus 121 connects various circuits of one or more processors represented by the processor 125 and a memory represented by the memory 126. The bus 121 may further connect various other circuits such as a peripheral device, a voltage regulator, and a power management circuit. These are all well-known in the art, and therefore are not further described in this specification. The bus interface 124 provides an interface between the bus 121 and the transceiver 122. The transceiver 122 may be one component or may be a plurality of components, for example, a plurality of receivers and transmitters, and provide a unit configured to communicate with various other apparatuses on a transmission medium. Data processed by the processor 125 is transmitted on a wireless medium by using the antenna 123. Further, the antenna 123 further receives data and transmits the data to the processor 125.

The network-side device 120 in this embodiment of this application further includes instructions or a program stored in the memory 126 and capable of running on the processor 125. The processor 125 invokes the instructions or program in the memory 126 to execute the method executed by the modules shown in FIG. 8, with the same technical effects achieved. To avoid repetition, details are not described herein again.

An embodiment of this application further provides a readable storage medium. The readable storage medium may be non-volatile or volatile. The readable storage medium stores a program or instructions, and when the program or instructions are executed by a processor, the processes of the foregoing method embodiment shown in FIG. 2 are implemented, or the processes of the foregoing method embodiment shown in FIG. 3 are implemented, or the processes of the foregoing method embodiment shown in FIG. 5 are implemented, with the same technical effects achieved. To avoid repetition, details are not described herein again.

An embodiment of this application further provides a computer program product. The computer program product is stored in a non-transitory storage medium, and the computer program product is executed by at least one processor to implement the processes of the foregoing method embodiment shown in FIG. 2, or the processes of the foregoing method embodiment shown in FIG. 3, or the processes of the foregoing method embodiment shown in FIG. 5, with same technical effects achieved. To avoid repetition, details are not described herein again.

The processor is the processor in the terminal in the foregoing embodiments. The readable storage medium includes a computer-readable storage medium, such as a computer read-only memory (ROM), a random access memory (RAM), a magnetic disk, or an optical disc.

An embodiment of this application further provides a chip. The chip includes a processor and a communication interface. The communication interface is coupled to the processor, and the processor is configured to run a program or instructions to implement the processes of the foregoing method embodiment shown in FIG. 2, or the processes of the foregoing method embodiment shown in FIG. 3, or the processes of the foregoing method embodiment shown in FIG. 5, with the same technical effects achieved. To avoid repetition, details are not described herein again.

It should be understood that the chip mentioned in this embodiment of this application may also be referred to as a system-level chip, a system chip, a chip system, or a system-on-chip.

It should be noted that, in this specification, the terms “include”, “comprise”, or any other variant thereof are intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by “includes a . . . ” does not preclude the existence of other identical elements in the process, method, article, or apparatus that includes the element. In addition, it should be noted that the scope of the method and apparatus in the implementations of this application is not limited to functions being performed in the order shown or discussed, but may further include functions being performed at substantially the same time or in a reverse order, depending on the functions involved. For example, the described method may be performed in an order different from the order described, and steps may be added, omitted, or combined. In addition, features described with reference to some examples may be combined in other examples.

According to the description of the foregoing implementations, a person skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be a mobile phone, a computer, a server, an air conditioner, a network-side device, or the like) to perform the method described in the embodiments of this application.

The foregoing describes the embodiments of this application with reference to the accompanying drawings. However, this application is not limited to the foregoing specific implementations. The foregoing specific implementations are merely illustrative rather than restrictive. As instructed by this application, a person of ordinary skill in the art may develop many other forms without departing from the principle of this application and the protection scope of the claims, and all such forms fall within the protection scope of this application.

What is claimed is:

1. An information processing method, comprising:

receiving, by a terminal, address information; and sending, by the terminal, the address information to an application;

wherein the address information comprises: address information of a domain name server.

2. The method according to claim 1, wherein the method further comprises:

receiving, by the terminal, a forwarding indication; wherein the sending the address information to an application comprises:

sending, by the terminal, the address information to an application corresponding to the address information according to the forwarding indication.

3. The method according to claim 2, wherein the forwarding indication comprises: an identification of the application corresponding to the address information.

4. The method according to claim 3, wherein the identification of the application comprises at least one of the following:

an application APP identification ID, a protocol data unit PDU session ID, an edge enabler client EEC ID, an application client AC ID, and an EEC provider ID.

5. The method according to claim 1, wherein the sending the address information to an application comprises at least one of the following:

storing, by the terminal, the address information in a first area, wherein the first area is a storage area of the application in an application layer; and storing, by the terminal, the address information in a second area, wherein the second area is a storage area that is corresponding to the application and that is in the terminal.

6. The method according to claim 1, wherein the application is an application in the application layer of the terminal.

7. The method according to claim 1, wherein the method further comprises:

reporting, by the terminal, a capability indication; wherein the capability indication indicates that the terminal supports or does not support forwarding the address information to the application.

8. The method according to claim 7, wherein the reporting a capability indication comprises:

reporting, by the terminal, the capability indication by using at least one of the following:

a PDU session establishment request and a PDU session modification request.

9. The method according to claim 2, wherein the receiving a forwarding indication comprises:

receiving, by the terminal, the forwarding indication by using at least one of the following:

PDU session establishment accept and PDU Session modification accept.

10. The method according to claim 1, wherein the domain name server comprises at least one of the following:

an edge application server discovery function (EASDF), a central domain name system DNS server, and a local DNS server.

11. An information processing method, comprising:

sending, by a network-side device, a forwarding indication; wherein the forwarding indication indicates a terminal to send received address information to an application corresponding to the address information;

wherein the address information comprises: address information of a domain name server.

12. The method according to claim 11, wherein before the sending a forwarding indication, the method further comprises:

receiving, by the network-side device, a capability indication of the terminal; wherein the capability indication indicates that the terminal supports or does not support forwarding the address information to the application; wherein the sending a forwarding indication comprises:

when the capability indication indicates that the terminal supports forwarding the address information to the application, sending, by the network-side device, the forwarding indication.

13. The method according to claim 11, wherein the forwarding indication comprises: an identification of the application corresponding to the address information.

14. An information processing method, comprising:

when a first condition is met, clearing, by a terminal, a DNS cache in the terminal; wherein the first condition comprises at least one of the following:

the terminal has released an old IP address;

the terminal has received a newly allocated IP address;

the terminal has received an indication for releasing the old IP address; and the terminal has sensed a change of an IP address.

15. The method according to claim 14, wherein the IP address comprises at least one of the following:

an Internet Protocol version 6 IPv6 prefix, an IP address of the terminal, an IP address of a PDU session, and an IP address of a user plane function.

16. The method according to claim 14, wherein the clearing a DNS cache in the terminal comprises any one of the following:

clearing, by the terminal, a DNS cache that is related to the old IP address and that is in the terminal; and clearing, by the terminal, all DNS caches in the terminal.

17. A terminal, comprising a processor, a memory, and a program or instructions stored in the memory and capable of running on the processor, wherein when the program or instructions are executed by the processor, the steps of the information processing method according to claim 1 are implemented.

18. A terminal, comprising a processor, a memory, and a program or instructions stored in the memory and capable of running on the processor, wherein when the program or instructions are executed by the processor, the steps of the information processing method according to claim 14 are implemented.

19. A network-side device, comprising a processor, a memory, and a program or instructions stored in the memory and capable of running on the processor, wherein when the program or instructions are executed by the processor, the steps of the information processing method according to claim 11 are implemented.

* * * * *